(12) United States Patent
Chartier et al.

(10) Patent No.: US 6,636,211 B2
(45) Date of Patent: Oct. 21, 2003

(54) CAD/CAM FEATURE TREE WITH MANIPULATABLE 3D MINIATURES

(75) Inventors: Valentin Chartier, Boulogne (FR); Khanh Linh Tong, Puteaux (FR)

(73) Assignee: Dassault Systemes, Suresnes Cedex (FR)

( * ) Notice: Subject to any disclaimer, the term of this patent is extended or adjusted under 35 U.S.C. 154(b) by 349 days.

(21) Appl. No.: 09/738,490

(22) Filed: Dec. 15, 2000

(65) Prior Publication Data

US 2002/0075257 A1 Jun. 20, 2002

(51) Int. Cl.[7] .............................................. G06T 15/00
(52) U.S. Cl. ...................................................... 345/420
(58) Field of Search ................................ 345/419, 420, 345/423, 474, 440

(56) References Cited

U.S. PATENT DOCUMENTS 4,737,921 A * 4/1988 Goldwasser et al. ........ 345/421
6,476,802 B1 * 11/2002 Rose et al. .................. 345/419

\* cited by examiner

Primary Examiner—Phu K. Nguyen
(74) Attorney, Agent, or Firm—Mitchell S. Feller; Clifford Chance US LLP

(57) ABSTRACT

An improved method of displaying the features of a three-dimensional graphical object model for subsequent selection by a user employs icons in a feature tree which are three-dimensional miniatures derived from the actual features present in the object model that the icon represents. Each 3D miniature corresponds to a specific feature in the object and has a similar, and preferably the same, geometry. Displayed 3D miniatures are shown from a viewpoint and rotation which matches the viewpoint and object rotation used in the graphical window. As the object is rotated, the rotation of the miniatures changes accordingly and as various features in the object are edited, the corresponding miniature is updated accordingly. Actions can also be performed on the miniatures and these actions applied to the corresponding feature in the model.

29 Claims, 8 Drawing Sheets

CAD/CAM FEATURE TREE WITH MANIPULATABLE 3D MINIATURES

FIELD OF THE INVENTION

This invention is related to an improved CAD/CAM feature tree for use in identifying and selecting features in an object model.

BACKGROUND

In computerized design tools, such as CAD, CAM, and CAE systems, a user is able to define and modify the geometry of a three dimensional object. The object is typically built of many different features, such as blocks, holes, fillets, etc., which are added to the object and successively modify its overall shape. Each feature is generally assigned a unique ID and, for a given object, the set of features which defines it is called the feature model.

A geometric modeler is used to translate the various features in an model, along with the attached geometric information, such as a feature's dimensions, into an overall model geometry. A three dimensional visual display of the model is generated by building a display model of the model geometry using tessellation, which divides the model geometry into a set of triangles for display purposes, or other techniques, such as voxel-based visualization. Once the model has been tessellated, a transformation matrix which defines object rotation, translation, and zoom, is applied to the display model and the image is displayed on the screen.

Often, a user will need to view an entire model and then select a particular feature in the model to edit. In conventional CAD/CAM/CAE systems, each of the various types of features in the model, such as part, hole, boss, are associated with a predefined two-dimensional icon and the various features in the model are represented in a specification tree format which lists each feature, via its 2D icon, and generally how that feature relates to higher and lower level object definitions. For example, all the "extruded features" will be represented by the same family icon, regardless of the geometry which results from the extrusion, and all the holes will have the same family icon representation in the tree, regardless of the final shape of the hole.

To modify an element, a user can select the element by selecting the corresponding icon in the feature tree. This method of representing the construction of the object may be convenient since it represents the general set of the added features. However, when geometry of the object is very complex, for example a gear box, it can be difficult for a user to select a particular feature to modify. In the graphical window which shows a rendition the object, various features may be partially or wholly obscured or their effects overlapping. Feature selection is further complicated because the 2D icons are assigned according to the feature type (e.g., Part, Hole, Boss . . . ) and all features of the same type or family are shown in the tree using the same icon. This makes selection of a specific feature from a number of features in the same family or of the same type difficult because each feature will appear the same in the tree. Similarly, is difficult to select in a complex part topological information of a feature which is buried into the model's final geometry.

A further drawback to conventional feature tree representations is that the icons are two-dimensional in nature. Even if a standard feature tree icon generally resembles the feature as it is shown in a rendition of the object (and assuming that the feature has not been modified from its default configuration a substantial degree), the computer will permit a user to perform 3D rotations of the object. As an object is rotated, each of the features of the object are rotated as well, passing in and out of view and changing orientation. This changing representation can increase the difficulty of identifying and selecting a specific feature to modify.

Some attempts have been made to simplify the use of feature trees to select object features. However, these attempts can be cumbersome for the user to employ and are limited in nature. For example, one conventional system allows limited customization of the feature specifications in the tree by permitting the user to assign a name to a specific feature icon so that the icon can be easily identified in the future. However, the user must manually name each specific features which is to be tracked.

In another system, a user can make a feature selection by clicking in the graphical window approximately where the feature should be. The system highlights one of the corresponding features and, through the use of a clipping plane each time the user clicks, highlights a different geometry until the right one is selected. Yet another system provides a separate selection navigator which allows a user, through the user of the graphical window and the feature tree, to navigate between topologically linked features until the desired feature is located. However, both of these other systems can require many mouse clicks or other actions to locate the desired feature. Further, in all systems, the object representation in the graphical window is not the same as the representation in the feature tree, making it difficult to determine if the selected feature is the desired one. The difficulty is compounded when a modification has to be done by a user who did not design the initial part.

Accordingly, there is a need for an improved system and method for displaying the features of a complex three-dimensional object which simplifies the identification and selection of features.

SUMMARY OF THE INVENTION

These and other needs are met by the present invention in which a feature tree is provided with icons that are three-dimensional miniatures derived from the actual features present in the object model that the icon represents. Each 3D miniature corresponds to a specific feature in the object. Displayed 3D miniatures can be shown from a rotation which matches the object rotation used in the graphical window. As the object is rotated, the rotation of the miniatures changes accordingly. The zoom factor of the miniature can also be adjusted relative to the zoom of the corresponding feature in the object model.

A specific feature in the object can be selected by selecting the corresponding miniature in the feature tree. By customizing each miniature to match to match its corresponding feature, a user can easily identify the miniature for a given feature, even if all the features are in the same family. Advantageously, because the tree shows the exact geometry of each of the object's features (or a suitable representation for non-geometric feature), it provides a better representation of those features and how the model has been built, simplifying selection of a desired feature.

According to a further aspect of the invention, a user can apply geometric transformations to a miniature by, e.g., rotating and translating the miniature to better allow the feature to be explored and scaling or zooming the miniature to alter its size relative to other miniatures and the main object.

According to yet another feature of the invention, various object editing commands, such as creating, modifying, or deleting a feature, can be performed directly through the 3D miniature feature tree. Because the miniatures correspond directly to features in the actual object, the object model being edited does not need to be shown in the display window for the user to select and edit the desired feature. As a result, the object does not need to be continuously rendered for display, reducing the computational needs of the editing software as well as freeing screen real-estate for the display of additional miniatures or other items. In addition, actions can be performed on the miniatures and subsequently applied to the corresponding features in the model. Because the miniatures are not cluttered by surrounding features, as the case in the model display, it can be easier to select aspects, such as edges or faces, in a miniature, than selecting these elements in the model itself.

BRIEF DESCRIPTION OF THE FIGURES

The foregoing and other features of the present invention will be more readily apparent from the following detailed description and drawings of illustrative embodiments of the invention in which.

DETAILED DESCRIPTION OF THE PREFERRED EMBODIMENTS

The present invention is directed to an improved method and system for displaying the features of a three-dimensional graphical object model. The model is comprised of plurality of features each of which has specific attributes. Although the features discussed below will be generally geometric in nature, features can also be non-geometric in nature. For example a model feature can specify element tolerances, distances between various object elements, and even a design creator. The present invention is well suited for use with regard to geometric features. However, the invention can also be modified for use with non-geometric features.

According to the invention, a miniature object is defined for at least a some of the features in the object model, wherein each miniature object has attributes derived from the attributes of the respective associated feature. In addition to displaying a visualization of the geometric model itself, a visualization of at least some of the miniature objects from a specified model viewpoint is also generated and displayed. The shape, perspective, and optionally scale, of the miniature visualization can be updated in a synchronous manner with the primary model as the model's features are edited and the display viewpoint and scale are altered. As a result, the displayed miniatures, which can be organized in a feature-tree format, are shown in a manner which directly corresponds to the shape and orientation of the corresponding feature in the displayed model.

The operation of the invention will first be discussed with reference to representative screen displays of a graphical modeling system implementing the invention. A specific embodiment of a system implementing the invention and a discussion of its functionality will then follow.

Figure 1:
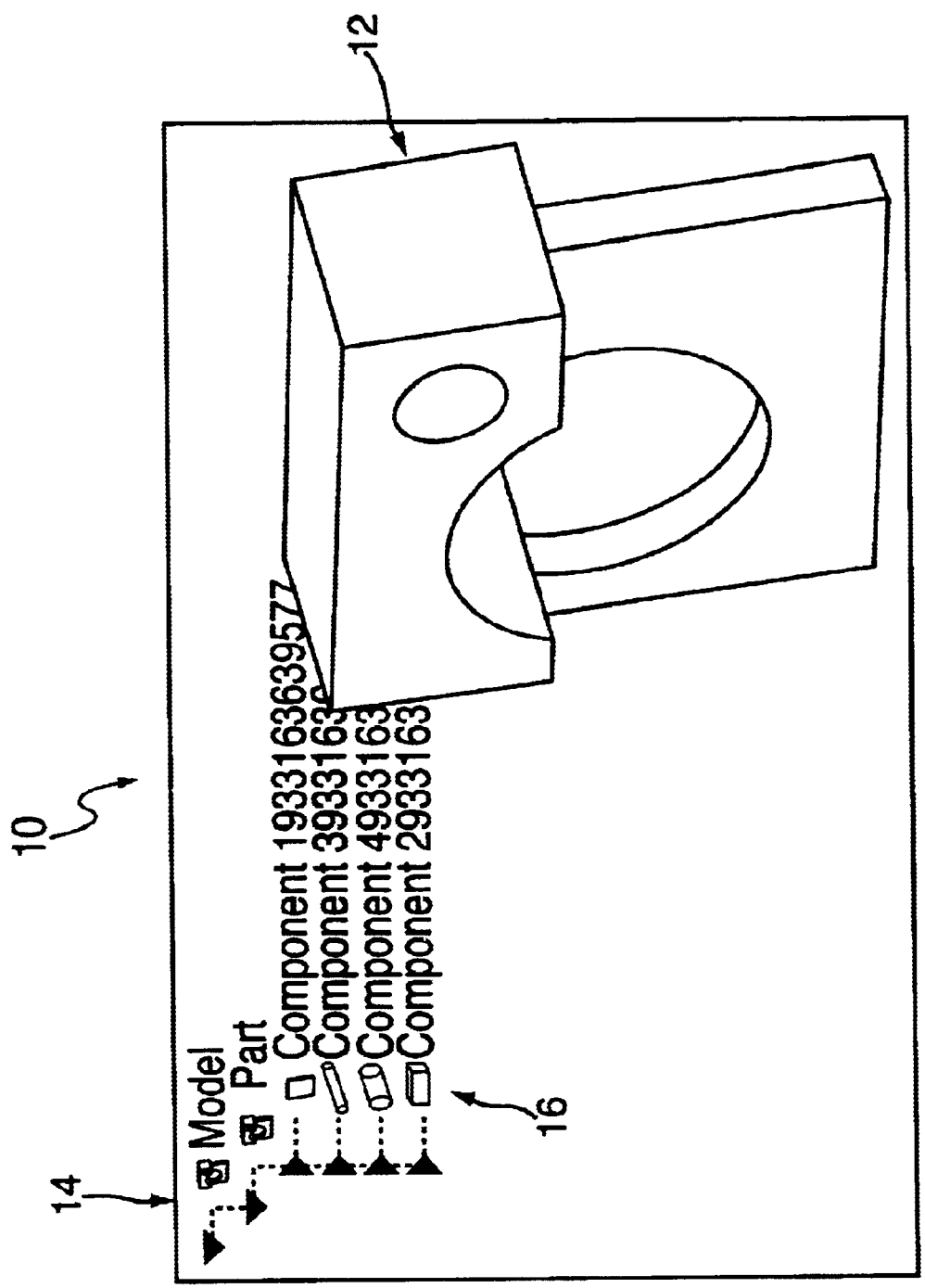
FIGS. 1 and 2 are representative displays of a graphical object and an associated 3D miniature feature tree further showing the synchronous rotation of the miniatures in the tree relative to the object rotation.

Turning to FIG. 1, there is shown a representative display 10 of a graphical object 12 which has been created using a computerized design tool. The object 12 is comprised of a number of separate features, such as cylinders, holes, two-dimensional sketches, etc., which have been combined to produce the object. For each of these features, a corresponding miniature 16 has been defined. The miniatures 16 can be displayed in a feature tree 14 which, in this representation, is organized in a hierarchical manner to show how the various features have been combined to create the object. Other ways of displaying the relationship between various miniatures 16 can also be used. Each of the miniatures are preferably rendered in an orientation or rotation which corresponds to the rotation used to display to the object 12.

Figure 2:
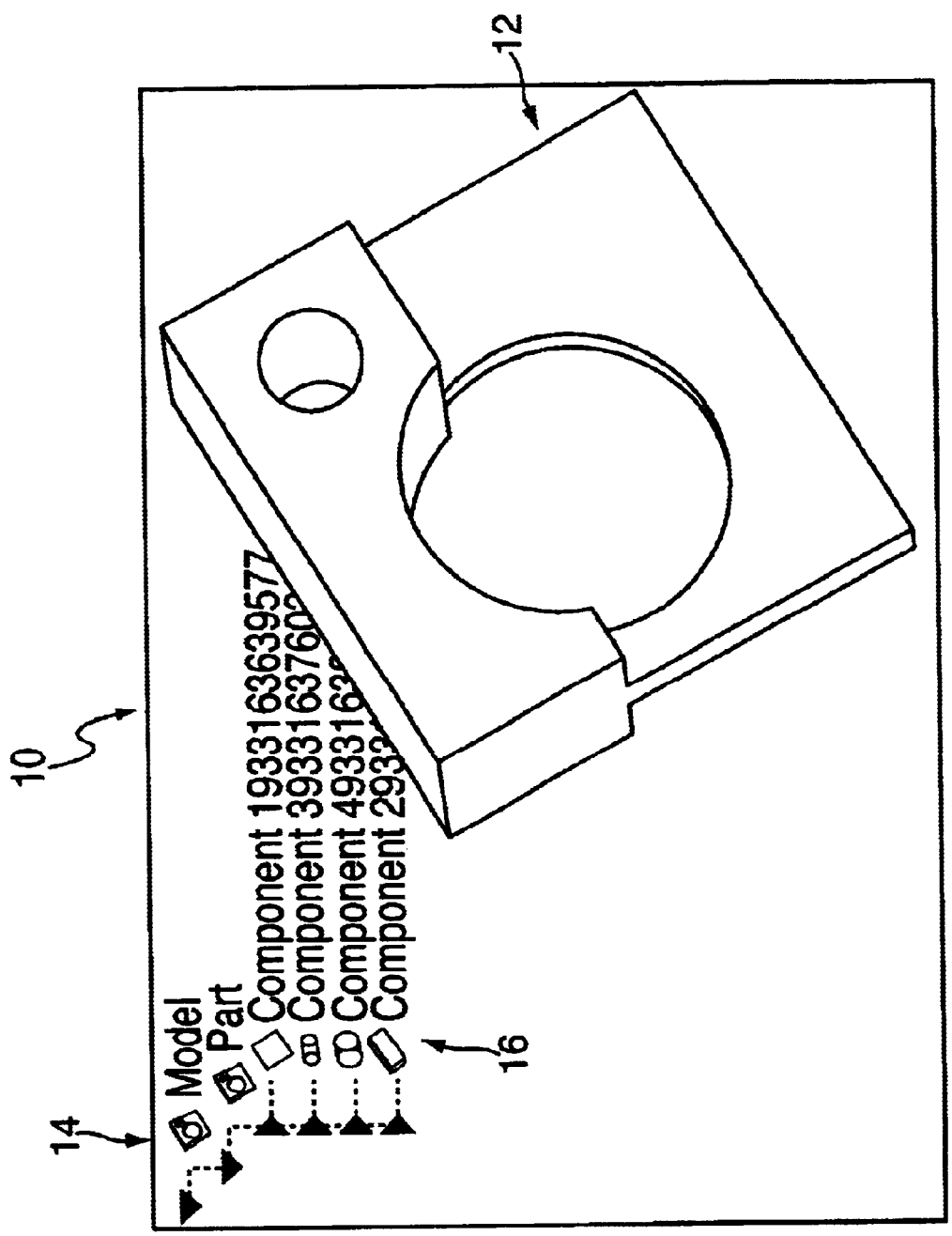

Turning to FIG. 2, there is shown the same model 12, but in a different orientation. The relative rotation of the miniatures 16 in the feature tree 14 has been updated to correspond to the new object orientation. Because both the shape and orientation of a given miniature matches the shape and orientation of the corresponding feature, this display greatly simplifies the task of identifying the miniature which corresponds to a specific feature of interest, particularly for complex objects.

As discussed in more detail below, the user can perform various model-related functions directly through the representative miniature display. Advantageously, because the miniatures are not generic, but have a image which is specifically defined by the associated feature, the object itself does not even need to be shown on the display for the user to be able to select and operate on specific features of interest.

In a particular embodiment, the user can directly alter the display and placement properties of a miniature, such as rotating the miniature or zooming on it to vary its size relative to the other miniatures. Other actions can also be performed. However, when the miniatures are shown by default in the proper position with respect to the visualization of the main object, support for miniature transformation actions of this type can be omitted without significantly diminishing the advantages provided by the use of the present invention.

Figure 3:
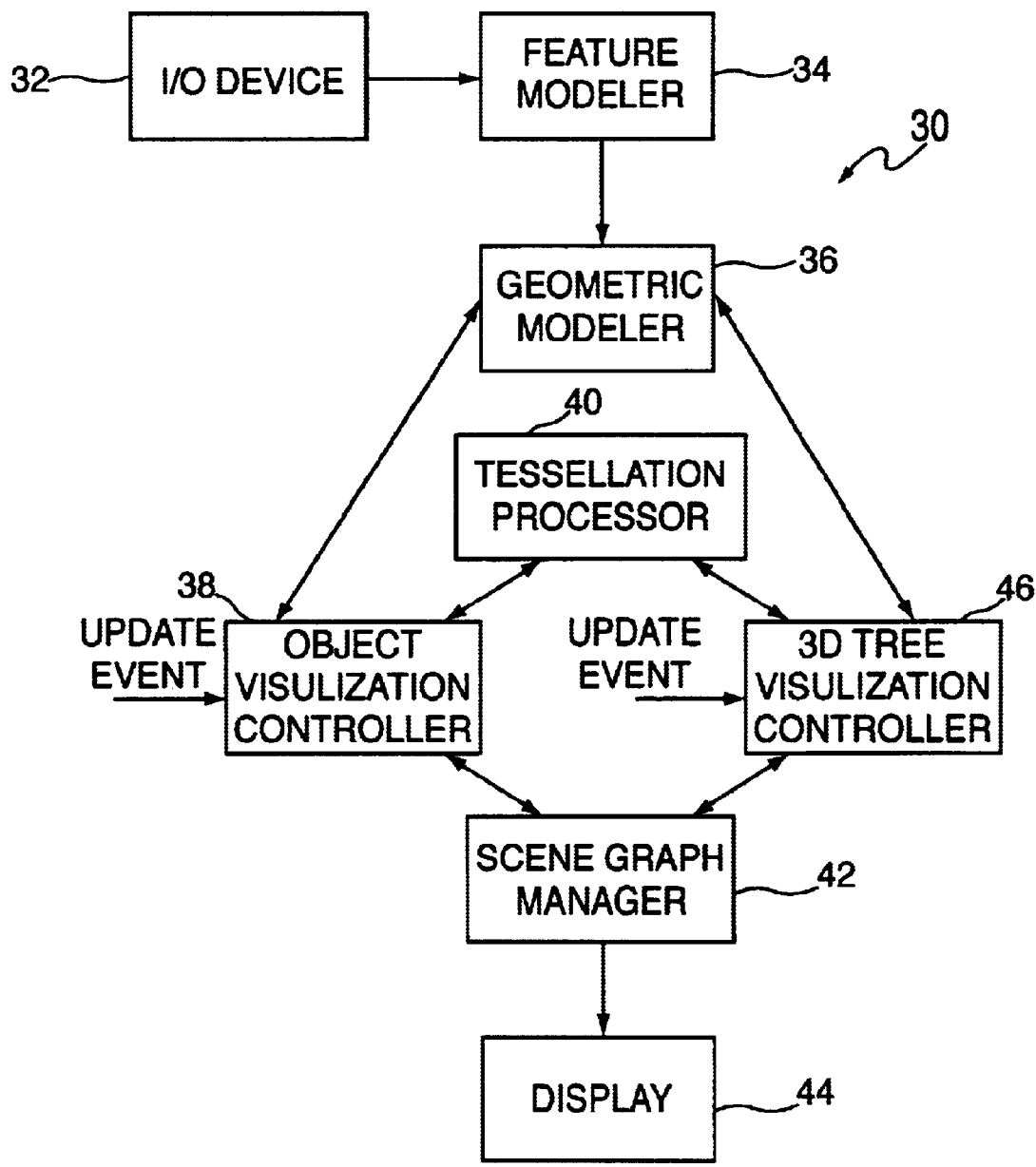
FIG. 3 is a block diagram of a system implementing the present invention.

Turning to FIG. 3, there is shown a block diagram of three-dimensional modeling system 30, such as a CAD, CAM, or CAE system, which can be used to create, edit, and visualize three-dimensional models and which further includes functionality to display three-dimensional miniatures of the various features in the model in accordance with the invention. The system 30 comprises a user input and output module 32 which provides access to a feature modeler module 34 which is used to define and process individual features and a geometric modeler module 36 which translates constitutive features (and their attached geometrical data, e.g. dimensions) to generate an overall model geometry. Once the model geometry is defined, it must be further processed by a visualization system to generate an image of the model suitable for display.

Various techniques are available for processing the feature and model data to create a visual display. In one embodiment, an object visualization controller ("OVC") module 38 can be provided which works in conjunction with a tessellation processor 40 to generate an image suitable for display. As will be recognized, the display image must be regenerated each time a user action changes the model in a way which affects its shape or how it is shown on the screen, e.g., by editing a feature or altering the display viewpoint. The OVC 38 preferably operates at the level of the model (or part) and takes into account all the modifications to the part feature that result from the user action, including those resulting directly from the editing of a particular constitutive feature as well as those caused by such editing on other constitutive features.

In general, the OVC 38 receives as input update events which indicate specific actions taken by a user and the part feature ID(s) effected. Upon receipt of update event indicating that an action by the user requires updating of a specified feature, the OVC 38 fetches the part feature data (for example, from the Feature Modeler 34), the updated part feature geometry from the Geometric Modeler 36, the corresponding tessellated geometry from the Tessellation Processor 40. Once this information is retrieved, the OVC 38 determines the positioning of the updated part on the screen. (When an existing part is updated, its position generally remains unchanged). This information is then used to generate (or modify) a set of visualization nodes. The OVC 38 further determines the rotation (R), translation (T) and zoom (Z) components of the corresponding transformation matrix. The set of visualization nodes and the transformation matrix are passed to a scene graph manager 42 which applies the matrix to the nodes and generates a graphical image which can be shown on a display 44.

According to the invention, in addition to displaying a visual representation of the object model at a given rotation, translation, and zoom, three-dimensional miniatures for at least some of the features in the object model are also displayed, preferably with at least the same orientation as the corresponding feature in the object model. Each miniature corresponds to a respective feature and sets of miniatures can be displayed apart from the composite object model to simplify identification and selection of a specific feature in the model. For selection purposes, the miniatures can be displayed in a feature-tree format which shows a relative order in which various features have been combined to form the object and its various sub-parts, if any. A feature in the object model can be selected by selecting the corresponding miniature in the feature tree representation. Because the miniatures look like the actual features they are associated with, identification of the proper miniature is simplified. While a feature-tree representation is preferred, various other formats for displaying the miniatures can also be used.

As discussed herein, an object model feature generally refers to a geometric element of the model. However, for purposes of the present invention, a feature can also refer to a non geometrical attribute or characteristic, such as a distance between two elements, a constraint on an element, or even the name of the developer who defined a specific element. For non-geometrical features, the graphical representation of the miniature may vary according to the particular way selected to represent that feature. In such cases, the display of the miniature may not be exclusively created by the visualization system's rendering system, e.g., tessellation, but may also include, in part or whole, other constituents, the display of which is generated in a different manner. The selection of these additional constituents and their manner of display is dependent on the type of non-geometric features represented. The precise selections and implementation of various non-geometric features is within the is well within the skills of one of ordinary skill in the art.

According to one aspect of the invention, displayed miniatures can be shown from a viewpoint which matches the viewpoint used in the graphical window to display the object. As the object is rotated, e.g., the position of the viewpoint is changed, the rotation of the displayed miniatures can be changed accordingly. Since the miniatures are derived from the corresponding feature definition data, the rendering functionality of the visualization system can be used, in conjunction with one or more suitable miniature transformation matrixes to subsequently to generate the views of the miniatures. As will be appreciated, depending on the desired complexity of the system miniatures can be visualized at a lower resolution to reduce the system resources required to visualize them. In addition, separate miniature object data can be provided to allow miniature display attributes, such as scale, relative rotation, resolution, etc., to be separately specified for respective miniatures. Such additional data can be specified in absolute terms or relative to the default values used or generated by the system for use in displaying the miniature.

In a preferred implementation, miniature management and display are managed by an additional tool which is added to the graphical editing system, which tool is referred to herein as a 3D Tree Visualization Controller (TVC) 46 as shown in FIG. 3. The TVC 46 operates in a manner similar to the operation of the OVC 38, discussed above, but it is not constrained by the hierarchy in which features are combined into the main object. Instead, it uses the existing feature definitions and visualization tools to generate separate miniature views of various features, alone or aggregated into higher level elements, and preferably at various levels in the hierarchical tree up to the tree's root. The generated miniature views can then be arranged and shown in various formats, including the preferred feature-tree format.

Figure 4:
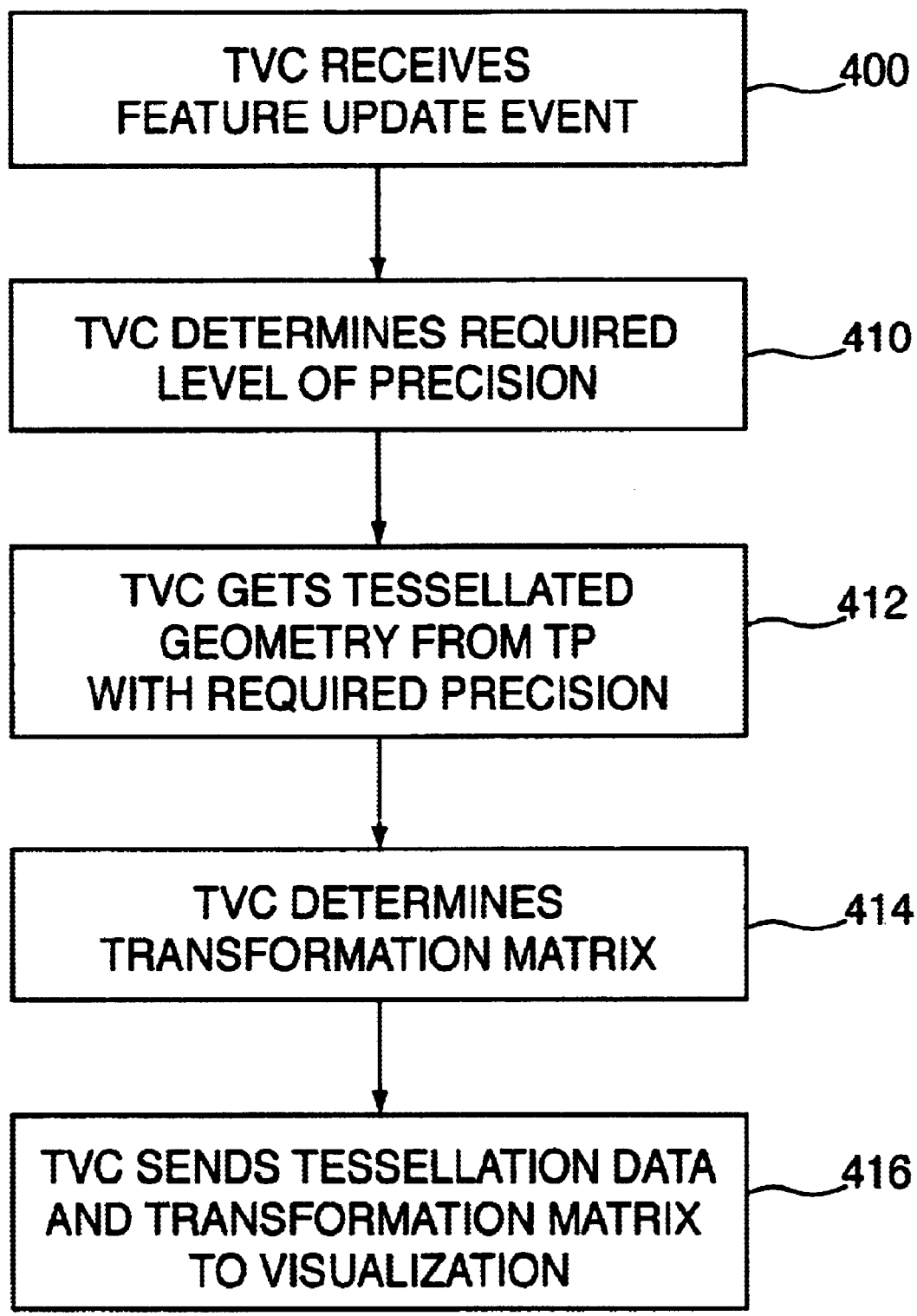
FIGS. 4–8 are flowcharts describing the general operation of the invention within a 3D object editing system.
Figure 5:
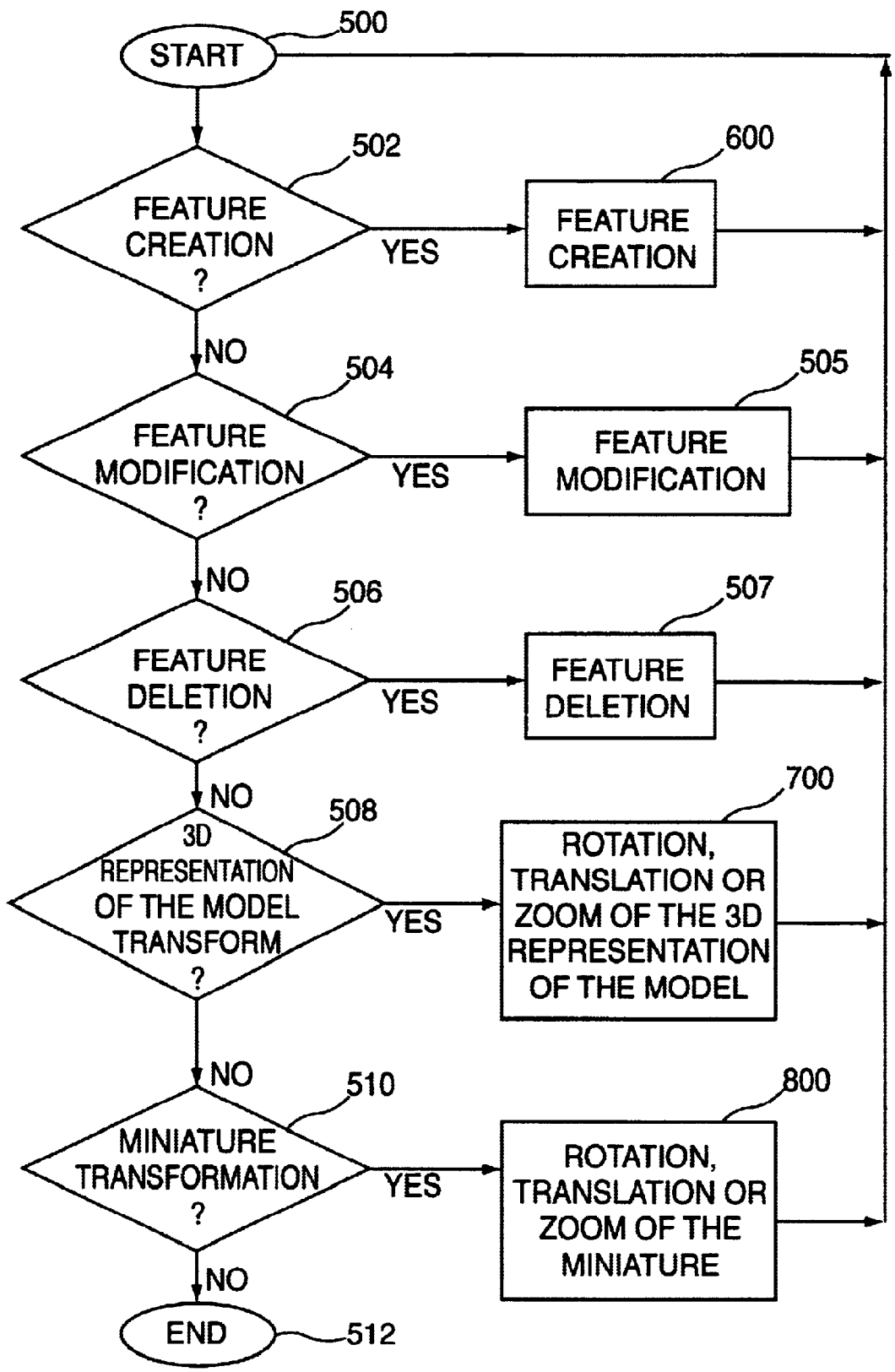

More particularly, and with reference to the flowchart of FIG. 4, each user action which is taken that requires updating of a part feature generates a series of update events, where each update event corresponds to the updating of a particular feature in the model and indicates the ID of the feature at issue. In addition to being sent to the OVC 38, the various updating events are also sent to the TVC 46. After the TVC 46 receives a feature update event (step 400), the TVC 46 accesses the tessellation processor 40 to generate the tessellated geometry for the feature specified in the update event. (Step 412). To improve system performance, and because the displayed miniatures may not need to be shown with as much precision as the main model image, the TVC 46 can request that the tessellation processor 40 use a lower degree of precision than would otherwise be desired. The appropriate degree of precision to use can vary depending on, e.g., the size of the miniatures, the complexity of the features, user preferences, etc. Accordingly, in a preferred embodiment, prior to requesting the tessellated geometry, the TVC 46 determines the appropriate level of precision to be used. (Step 410).

After the tessellated feature geometry has been obtained, the TVC 46 then determines the transformation matrix which should be applied to the miniature representation. (Step 414). Preferably, at least the rotation component R of the primary transformation matrix is used. In addition, the scale component Z can be selected to be related to the scale of the feature as shown in the combined model. For example, the miniatures can all be shown at one-quarter the scale of the primary model. Preferably, the user can select the desired proportion of miniature scale to the model scale.

Finally, an appropriate translation T can be selected, if desired. The particular translation used is dependent, to some extent, on the manner in which the miniatures are displayed. Thus, for example, in a hierarchical feature-tree representation, the translation can be used to offset the position of the miniature, e.g., to the right, an amount dependent on the hierarchical level of the miniature. Alternatively, offsets can be handled during the placement of the visualized image of the miniature on the screen and no translation may be necessary in the matrix.

In a more sophisticated embodiment, a translation can be selected which will corresponds to the placement of the feature in the model relative to a central point. Each miniature can then be displayed in conjunction with an associated point or set of axes which represents the central point. The relative placement of the miniature compared with the associated reference point or axes would then indicate the position in the 3D geometric model where the feature corresponding to that miniature is located. This additional information can be useful when trying to select a specific feature from a model that contains several duplicate features which differ only in their placement.

In addition, depending on the particulars of the modeling system, the TVC 46 can also add manipulators to the miniature, which may be the same or different from the part feature manipulators inserted by the OVC. These manipulators can be used to adjust or access various properties of the miniature, either in isolation, or as a way to manipulate the corresponding properties of the associated feature in the primary model. Finally, the TVC 46 updates (i.e. creates, modifies or deletes) the visualization nodes in the scene graph manager for visualization on the display and sends the updated tessellation data and transformation matrix to the scene graph manager 42 to generate a visual image of the properly rotated and scaled miniature. (Step 416).

Once the appropriate representations of the miniatures are defined, the system can display them in an appropriate format, such as a feature-tree. The selection and arrangement of the miniatures on the screen and subsequent processing of user selections of various displayed miniatures is performed in the same general manner as is done with regards to a conventional 2D family feature icon feature-tree representation. Suitable implementations of this "downstream" functionality will be known to those of skill in the art and is thus not specifically discussed herein.

One of the major advantages of the creation and use of miniatures according to the invention lies in the fact that once the miniature has been created and displayed, it can be used in the same way as the model itself to select specific geometrical elements, such as faces or edges, and execute program functions as if the selection of such geometrical elements was made on the model itself. Advantageously, this permits the easy identification and selection of geometrical elements which may no longer directly exist as such in the model or that may otherwise not be directly accessible for selection in the model. For example, when two feature are combined in the model, the intermediate faces and edges may no longer be shown in the model, even though they are still part of the defined features. However, because these faces and edges are part of the feature definition, they will appear in the corresponding miniature. In the event that small size of the miniature makes it difficult to select individual elements, the user can zoom the specific miniature to get a better view of the elements she wants to select.

Turning to FIGS. 5–8, there are shown high-level flow charts of the overall system processes used to implement three-dimensional miniature functionality as discussed above. The system begins from a default state and awaits user input. (Step 500). If the user selects to create a new feature (step 502), a feature creation process is executed (step 600). Similarly, the user can select to modify an existing feature (step 504) or delete a feature (step 506), and a feature modification process (step 505) or feature deletion process (step 507), respectively, can be invoked. In addition, the user can select to transform the main three-dimensional representation of the model (step 508), upon which the system will execute an appropriate rotation, translation, and zoom process (step 700). Finally, in the preferred embodiment, the user is also permitted to directly transform a selected miniature separate from visual transformations of the model itself. When this option is selected (step 510), an appropriate miniature transformation process is executed (step 800).

Figure 6:
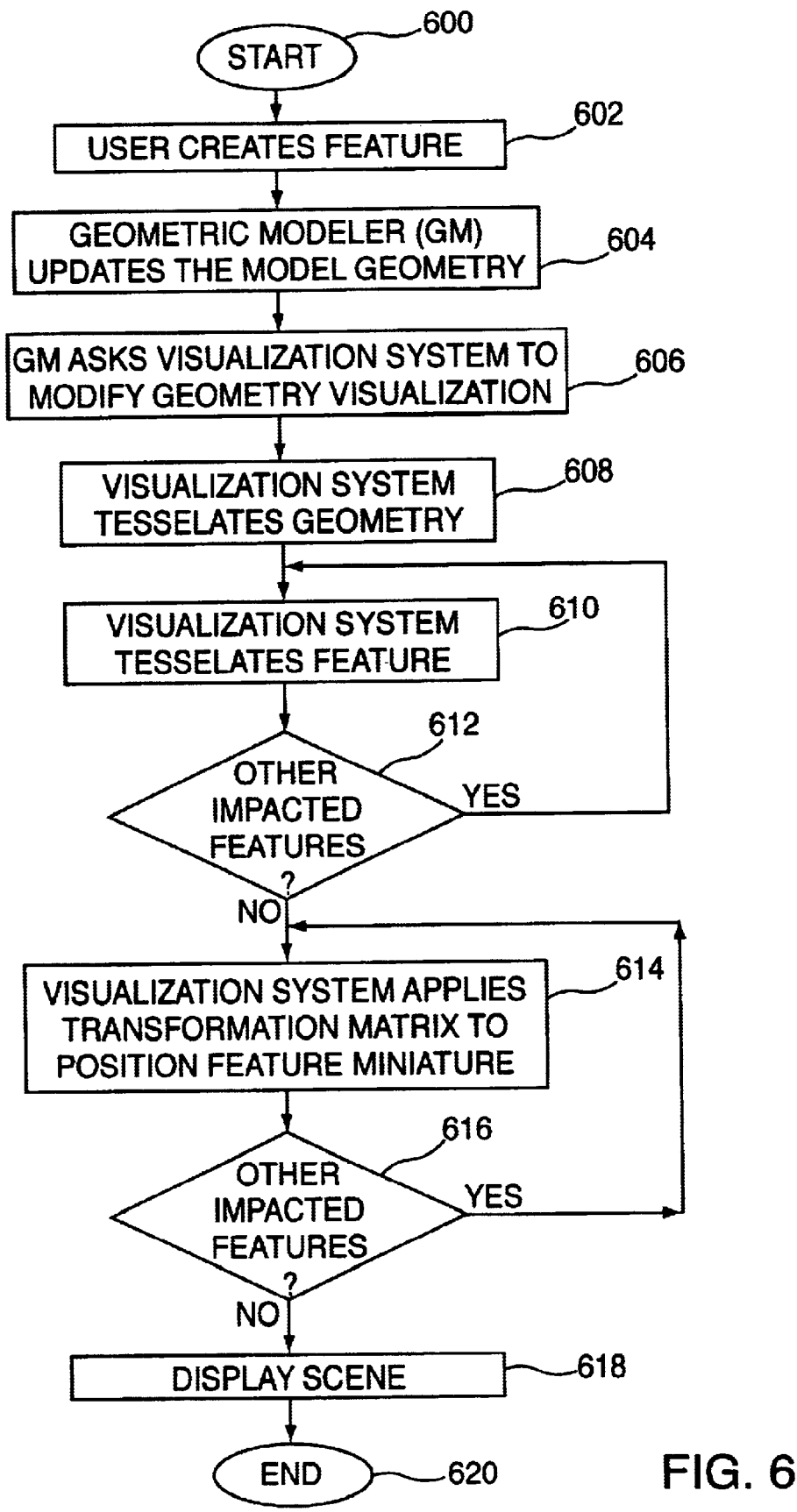

FIG. 6 shows a flowchart of a feature creation process 600. The feature modification and feature deletion processes are generally similar and are therefore not specifically discussed herein. After the primary feature editing process is executed (step 602), the geometric modeler updates the model geometry accordingly (step 604). The geometric modeler then signals the visualization system that an updated display is needed (step 606) and the visualization system tessellates the model geometry (step 608). In addition, the visualization system is instructed (e.g., by the TVC), to tessellate the newly created feature for use as a miniature display. (Step 610). If the new feature has been defined in a way which may impact the accuracy of a prior tessellation of any of the other features, the visualization system is instructed to tessellate those additional impacted features as well. (Step 612). Subsequently, the system displays the scene with the updated model and miniatures. (Step 614).

Figure 7:
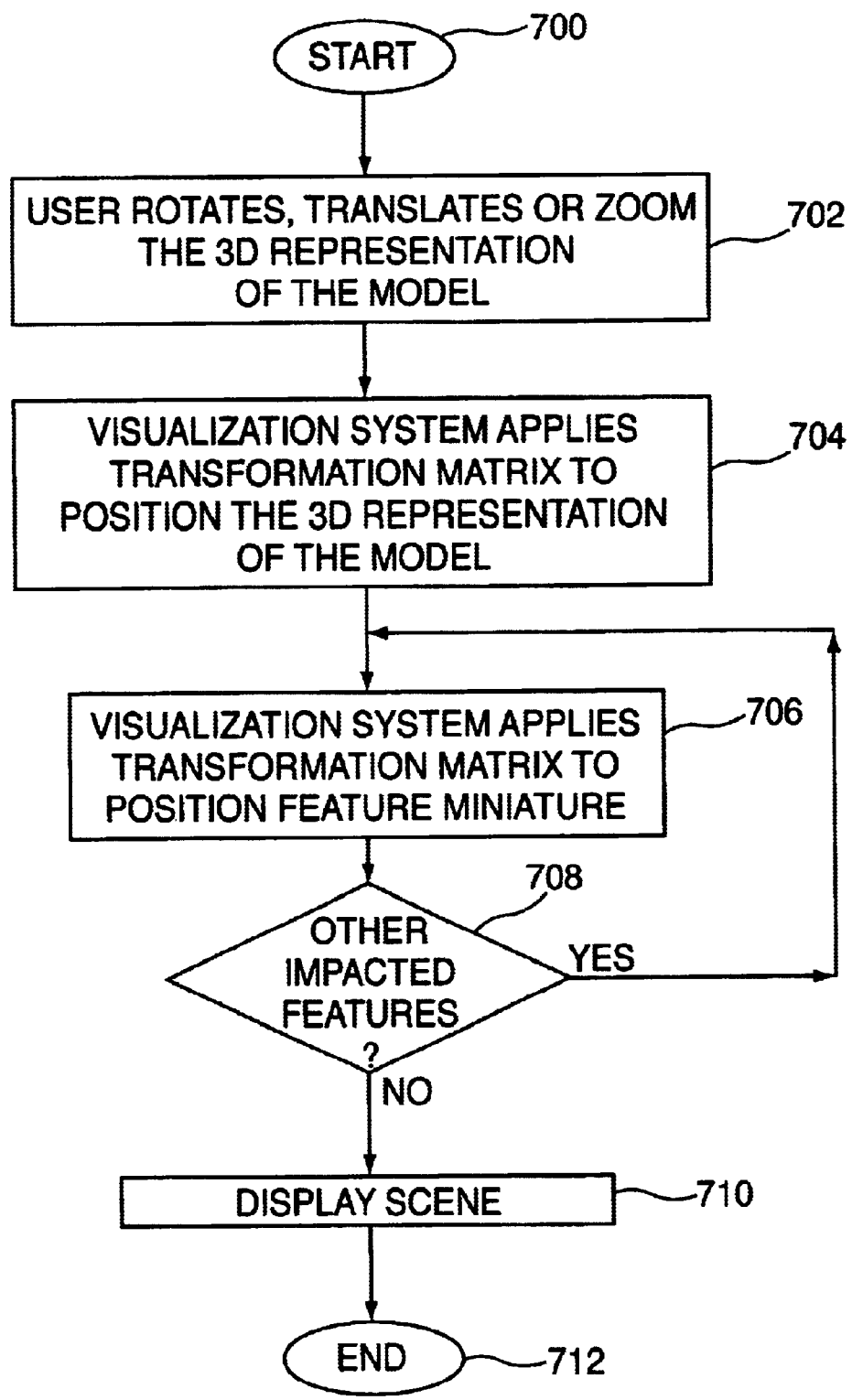
Figure 8:
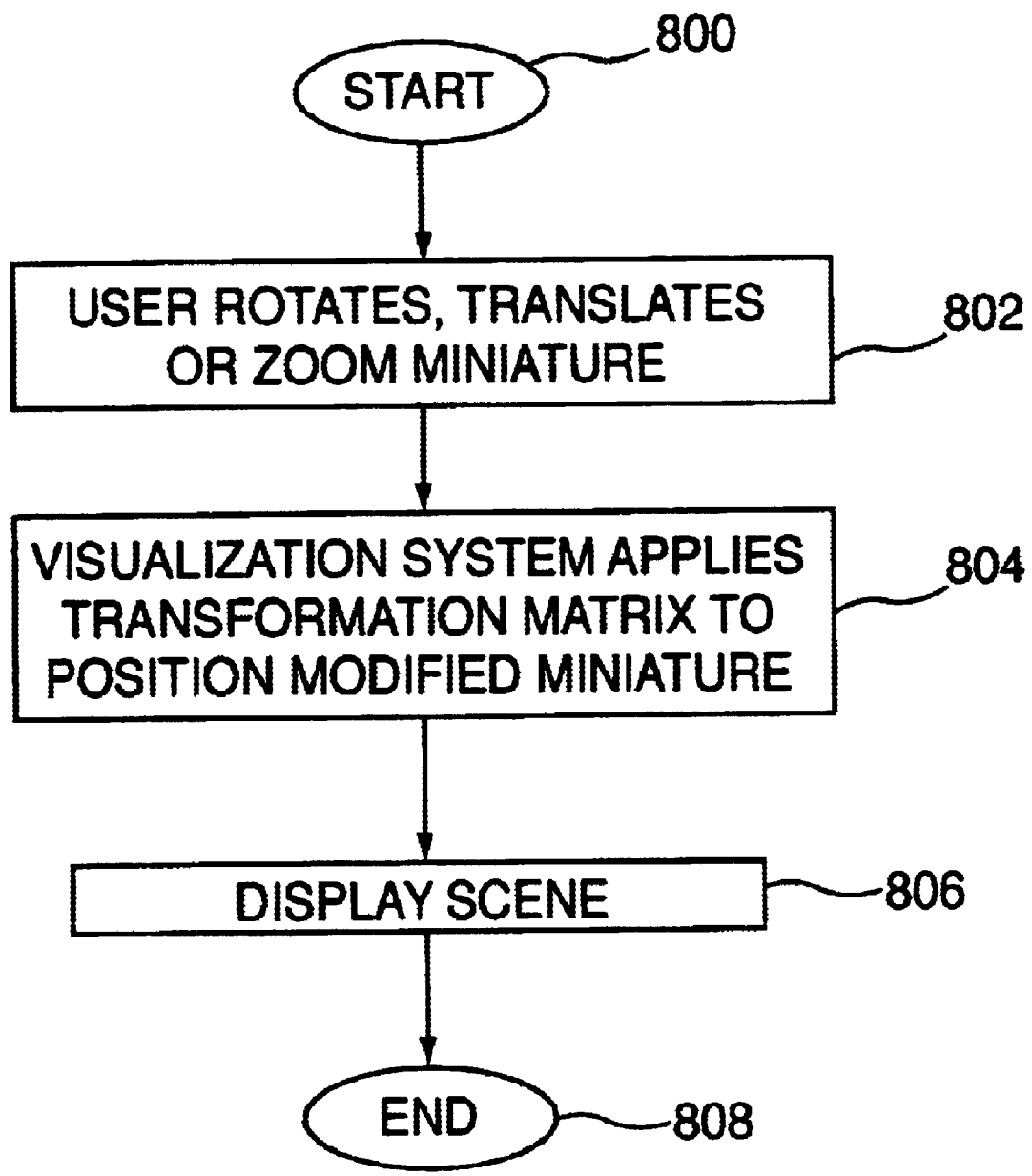

In addition to editing the model, the user can select to adjust how the model is displayed on the screen. As shown in FIG. 7, when a user selects this option, the transformation parameters are received from the user and an updated transformation matrix is generated. (Step 702). The visualization system then applies the new transformation matrix to the existing (tessellated) representation of the model (step 704). In addition, the transformation matrix or a suitable derivatives generated for use with the miniatures are also applied to the each of the various miniatures which are effected by the transformation. (Steps 706, 708). The transformed model and miniatures are then displayed as appropriate. (Step 710).

In one embodiment, the user is permitted to apply a transformation directly to a specified miniature, which miniature transformation can differ from the transformation of the main model. If such an action is selected, and with reference to FIG. 8, the user-desired rotation, translation, zoom, or other transformation is performed on the miniature itself (step 802), preferably using an interface and functional methodology similar to that used to operate on the model. The visualization system then applies the resulting miniature transformation matrix to the tessellated visualization of the transformed miniature (step 804) and the updated scene is redisplayed (step 806).

The invention has been disclosed and discussed above with regards to preferred embodiments thereof. Various changes in form and implementation can be made without departing from the spirit and scope of the invention. For example, the manner in which the various miniatures are organized on the display is not critical to the invention and arrangements and organizations other than a feature tree can be used as well.

What is claimed is:

1. A method for displaying features of a three-dimensional model comprising a plurality of features, the method comprising the steps of:

generating a visualization of the model;

generating miniature objects for at least some of the features in the model, each miniature object comprising a three dimensional visualization of a respective feature; and displaying an image of at least some of the miniature objects in a feature tree format.

2. The method of claim 1, further comprising the step of displaying an image of the model visualization.

3. The method of claim 1, wherein the image of at least some of the miniature objects are displayed from a rotation corresponding to a defined model rotation.

4. The method of claim 1, wherein the step of displaying comprises:

generating at least one miniature transformation matrix for application to the miniature objects; and applying the miniature transformation matrix to each of the miniature objects to be displayed.

5. The method of claim 4, wherein the miniature transformation matrix represents a miniature rotation related to a defined model rotation.

6. The method of claim 5, wherein the miniature rotation is substantially equal to the defined model rotation.

7. The method of claim 4, wherein a separate miniature transformation matrix is generated for each respective miniature object.

8. The method of claim 1, further comprising the steps of:

processing a modification of the model, the modification comprising one of adding, editing, and deleting a feature;

generating a revised model visualization of the model;

determining the features in the model effected by the modification; and generating a revised miniature object visualization for the miniature objects corresponding to the effected features.

9. The method of claim 1, further comprising the steps of:

processing a transformation applied to the model; and applying the transformation to the miniature objects.

10. The method of claim 9, further comprising the steps of:

displaying the model visualization with the applied transformation; and displaying at least some of the miniature objects with the applied transformation.

11. The method of claim 1 wherein visualization comprises tessellating.

12. The method of claim 1, further comprising the steps of:

receiving a selection from a user of a particular miniature object; and applying the selection to the feature in the model corresponding with the selected miniature object.

13. The method of claim 12, further comprising the step of:

performing an action on the selected miniature object; and applying the action to the feature in the model corresponding with the selected miniature object.

14. The method of claim 1, further comprising the step of applying a zoom factor to a selected miniature object, the selected miniature object subsequently displayed using the applied zoom factor.

15. A method for displaying the features of a three-dimensional model comprising a plurality of features, the method comprising the steps of:

generating a model visualization of the model;

applying a model transformation matrix to the model visualization, the transformation matrix comprising data representing at least a model rotation;

displaying an image of the transformed model visualization;

generating a miniature visualization for at least some of the features in the model, each miniature visualization corresponding to a particular feature in the model;

generating a miniature transformation matrix comprising data representing at least the model rotation;

applying the miniature transformation matrix to at least some of the miniature visualizations; and displaying the transformed miniature visualizations in a feature tree format.

16. The method of claim 15, wherein the miniature visualization is generated at a precision less than the model visualization.

17. The method of claim 15 wherein the visualizations are generated using tessellation.

18. The method of claim 15, further comprising the steps of, in response to an update to the model geometry:

generating an updated model visualization of the updated model;

identifying features in the updated model impacted by the update;

generating an updated miniature visualization for the identified features;

applying the model transformation matrix to the updated model visualization;

displaying an image of the transformed model visualization;

applying the miniature transformation matrix to at least some of the updated miniature visualizations; and displaying the transformed updated miniature visualizations.

19. A system for displaying the features of a three-dimensional model, the system comprising:

an object modeler configured to generate a model comprising a plurality of features;

an object model visualization controller configured to generate a visualization of the model;

a tree visualization controller configured to generate three dimensional miniature visualizations corresponding to particular features in the model; and a display system configured to produce an image of the model from a specified model rotation and images of at least some of the miniatures in a feature tree format.

20. The system of claim 19, wherein the display system is configured to produce an image of the miniatures at the specified model rotation.

21. The system of claim 19, wherein the object modeler comprises:

a user input module;

a feature modeler configured to generate a plurality of geometric features in response to user input; and a geometric modeler configured to combine the plurality of features into a geometric model.

22. The system of claim 19, wherein the display system comprises:

a visualization module receiving geometric data as input and providing visualized data as output;

a scene graph manager configured to receive visualization data and produce image data suitable for display; and an object visualization controller configured to, upon receiving an update event signal indicating an action by a user which effects at least one feature:

pass the geometric model to the visualization module and retrieve a model visualization, apply a model transformation matrix representing at least a model rotation to the model visualization, and pass the transformed model visualization to the scene graph manager.

23. The system of claim 22, wherein the tree visualization controller is configured to, upon receiving the update event signal:

identify the features effected by the user action;

pass each of the effected features to the visualization module and retrieve corresponding miniature visualizations;

generate a miniature transformation matrix comprising data representing at least the model rotation;

apply the miniature transformation to the miniature visualizations; and pass the transformed miniature visualization to the scene graph manager.

24. The system of claim 23, wherein the tree visualization controller is further configured to determine a miniature visualization precision for use in generating the miniature visualizations, wherein the miniature visualization precision can be less than a visualization precision of the model visualization.

25. The system of claim 22, wherein the visualization module is configured to execute a tessellation process.

26. The system of claim 19, wherein the tree visualization controller is further configured to:

receive a selection from a user of a particular miniature object and an action to perform on that object;

apply the selection to the feature in the model corresponding with the selected miniature object; and perform the action on the feature in the model corresponding with the selected miniature object.

27. In a system for displaying the features of a three-dimensional model, the system comprising an object modeler configured to generate a model comprising a plurality of features, a visualization module receiving geometric data as input and providing visualized data as output, a scene graph manager configured to receive visualization data and produce image data suitable for display, and an object visualization controller configured to pass the geometric model to the visualization module and retrieve a model visualization, apply a model transformation matrix representing at least a model rotation to the model visualization, and pass the transformed model visualization to the scene graph manager; the improvement comprising:

a tree visualization controller configured to generate three dimensional miniature visualizations via the visualization module corresponding to particular features in the model and pass the miniature visualizations to the scene graph manager for display in a feature-tree format in conjunction with the model.

28. The system of claim 27, wherein the tree visualization controller is configured to, upon receiving an update event signal indicating an action by a user which effects at least one feature:

identify the features effected by the user action;

pass each of the effected features to the visualization module and retrieve corresponding miniature visualizations, generate a miniature transformation matrix comprising data representing at least a specified model rotation;

apply the miniature transformation to the miniature visualizations; and pass the transformed miniature visualization to the scene graph manager.

29. The system of claim 27, wherein the tree visualization controller is configured to determine a miniature visualization precision for use in generating the miniature visualizations, wherein the miniature visualization precision can be less than a visualization precision of the model visualization.

* * * * *